(12) United States Patent
Pfandl et al.

(10) Patent No.: US 10,695,843 B2
(45) Date of Patent: Jun. 30, 2020

(54) SYSTEM FOR MACHINING OF A COMPONENT, AND COMPONENT AND CLAMPING ELEMENT FOR THE SYSTEM

(71) Applicant: Aktiebolaget SKF, Gothenburg (SE)

(72) Inventors: Erich Pfandl, Zeltweg (AT); Johann Moitzi, Eppenstein (AT)

(73) Assignee: AKTIEBOLAGET SKF, Göteborg (SE)

( * ) Notice: Subject to any disclaimer, the term of this patent is extended or adjusted under 35 U.S.C. 154(b) by 115 days.

(21) Appl. No.: 15/636,796

(22) Filed: Jun. 29, 2017

(65) Prior Publication Data
US 2018/0001393 A1    Jan. 4, 2018

(30) Foreign Application Priority Data

Jun. 30, 2016 (DE) .......... 10 2016 211 905

(51) Int. Cl.
| | | |
|---|---|---|
| B23B 31/11 | (2006.01) | |
| B23B 31/117 | (2006.01) | |
| B23B 31/16 | (2006.01) | |
| B23B 31/10 | (2006.01) | |

(52) U.S. Cl.
CPC .......... B23B 31/117 (2013.01); B23B 31/102 (2013.01); B23B 31/1627 (2013.01); *B23B 2226/61* (2013.01)

(58) Field of Classification Search
CPC .. B23Q 3/06; B23Q 3/12; B23Q 3/062; B23B 31/02; B25B 11/00; B23K 37/04; B23K 2101/04; B29C 65/02; B29D 23/00; B65D 25/22; B65D 53/62; B65D 23/10; B65D 23/102
See application file for complete search history.

(56) References Cited

U.S. PATENT DOCUMENTS

| | | | | |
|---|---|---|---|---|
| 1,859,710 A | * | 5/1932 | Neubauer .............. | B65D 45/16 215/272 |
| 2,095,960 A | * | 10/1937 | Bach ......................... | B67B 3/24 141/65 |
| 2,209,892 A | * | 7/1940 | Melrath ................ | B21D 51/38 413/38 |
| 2,579,775 A | * | 12/1951 | Allen ....................... | B67B 3/14 156/565 |
| 2,647,523 A | * | 8/1953 | Vollender, Jr. ...... | A24F 19/0035 131/257 |

(Continued)

FOREIGN PATENT DOCUMENTS

| | | |
|---|---|---|
| CN | 103786046 A | 5/2014 |
| CN | 104002166 A | 8/2014 |

*Primary Examiner* — Nicole N Ramos
(74) *Attorney, Agent, or Firm* — J-Tek Law PLLC; Scott T. Wakeman; Mark A. Ussai

(57) ABSTRACT

A system includes a component to be machined, the component having a plastic base body having an outer diameter and a longitudinal axis and at least one clamping auxiliary structure, and a clamping element configured to clamp the component using the clamping auxiliary structure. The clamping element includes at least one clamping jaw having at least one counter-clamping auxiliary structure that is configured to engage the clamping auxiliary structure and to fix the component in an interference-fit manner in the axial direction with respect to the clamping element. Also a machining method using the system.

13 Claims, 3 Drawing Sheets

(56) References Cited

U.S. PATENT DOCUMENTS

| | | | | | |
|---|---|---|---|---|---|
| 2,903,230 | A | * | 9/1959 | Schachte | B65B 1/34 |
| | | | | | 177/116 |
| 2,931,258 | A | * | 4/1960 | Ronning, Jr. | B67B 7/18 |
| | | | | | 81/3.44 |
| 3,205,570 | A | * | 9/1965 | Morin | B29C 37/02 |
| | | | | | 164/262 |
| 3,959,426 | A | * | 5/1976 | Seefluth | B29C 49/4205 |
| | | | | | 264/520 |
| 3,967,847 | A | * | 7/1976 | Ellis | B08B 9/426 |
| | | | | | 294/116 |
| 4,088,239 | A | * | 5/1978 | Uhlig | B65D 25/22 |
| | | | | | 220/4.05 |
| 4,319,543 | A | * | 3/1982 | Shank | B05B 12/20 |
| | | | | | 118/503 |
| 6,015,062 | A | * | 1/2000 | Bachmann | B21D 51/38 |
| | | | | | 220/295 |
| 2009/0224112 | A1 | * | 9/2009 | Carrasco | A61J 9/06 |
| | | | | | 248/104 |
| 2018/0029864 | A1 | * | 2/2018 | Blackburn | B65D 25/14 |

* cited by examiner

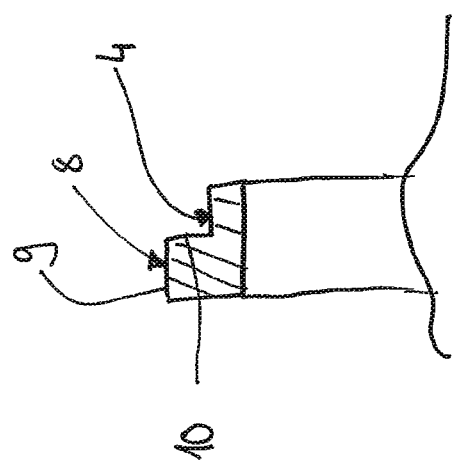

SYSTEM FOR MACHINING OF A COMPONENT, AND COMPONENT AND CLAMPING ELEMENT FOR THE SYSTEM

CROSS-REFERENCE

This application claims priority to German patent application no. DE 10 2016 211 905.2 filed on Jun. 30, 2016, the contents of which are fully incorporated herein by reference.

TECHNOLOGICAL FIELD

Exemplary embodiments relate to a system for machining a component and to the component and a clamping element for the system.

BACKGROUND

In a variety of different machining processes, for example, turning, milling, or grinding, components are clamped in a clamping chuck, for example, with the help of clamping jaws. An axial securing of the component usually occurs here by friction fit.

One such application is, for example, the turning of plastic or plastic semi-finished products. For this purpose the semi-finished product or the plastic component that is to be turned is fixed in a jaw chuck by clamping jaws. Depending on a diameter of the semi-finished product, under certain circumstances different jaw sizes must be used. The semi-finished product or the to-be-processed component is then held only by friction between a semi-finished product outer side and a clamping jaw contour. High clamping forces are thus required. Under unfavorable circumstances it can happen that the semi-finished product or the to-be-processed component is deformed. In order to prevent such a deforming a high number of clamping-jaw sets, for example, more than 15, possibly even 18, are usually used. Each set here is matched to a certain diameter range. Almost the entire circumference of the semi-finished product can thereby be enclosed by the matching set. Providing so many different clamping jaw sets can possibly be very material- and space-intensive.

SUMMARY

There is therefore a need to provide an improved concept for machining. This need is addressed by the system, the component, and the clamping element according to the independent claims.

Exemplary embodiments relate to a system for machining a component. For this purpose the system comprises the component including a base body made of plastic. The component also comprises a clamping auxiliary structure. Furthermore, the system comprises a clamping element that is configured to clamp the component. The clamping element comprises at least one clamping jaw including at least one counter-clamping auxiliary structure. The counter-clamping auxiliary structure is configured to engage the clamping auxiliary structure and fix the component by interference fit in the axial direction with respect to the clamping element. Since an interference fit is present in the axial direction, in some exemplary embodiments a lower number of clamping jaws and/or a lower clamping force can be used as compared to variants wherein the axial securing is achieved via a friction fit. In some exemplary embodiments a deforming of the component can thereby be at least reduced or even completely prevented.

The component can be all possible components that come into consideration for a machining, for example, a turning, a grinding, or the like, for example, a semi-finished product, a tube, for example, having an annular cross-section, a cylinder, for example, having a circular, a rectangular, a triangular, or another cross-section, a cone, or the like. Additionally or alternatively the base body can also have one of the described shapes.

All possible plastics can be used as plastic, for example, polyethylene (PE), HDPE (high-density PE), LLDPE (linear low-density PE), LDPE (low density PE), polypropylene (PP), polyvinyl chloride (PVC), polystyrene (PS), polyurethane (PU/PUR), polyethylene terephthalate (PET), or the like.

The clamping element can be, for example, any component that is configured to hold a component for a machining, for example, for a turning. In other words, the clamping element can be configured to arrange the component such that it can be rotated about its own longitudinal or rotational axis. For this purpose the clamping element can include at least one clamping jaw, but also two or three clamping jaws. The clamping auxiliary structure and the counter-clamping auxiliary structure, which are in engagement with each other in order to fix the component in the axial direction in an interference-fit manner and via a clamping element, can be any structures on the component and the clamping jaw that in combination with each other make possible an interference fit in the axial direction. For example, the clamping auxiliary structure can be a recess, and the counter-clamping auxiliary structure can be projection, a hook, or an elevation that engages in the recess. A fixing in the axial direction can then be present, for example, when a relative moving of the component with respect to the clamping element is prevented in the axial direction. The component can also be fixed in the circumferential direction and/or in the radial direction in the clamping element, for example, in a friction- or interference-fit manner.

Additionally or alternatively the clamping auxiliary structure can have a larger diameter and/or a smaller diameter than a surface of the component, which surface is directly adjacent in the axial direction. In some exemplary embodiments the interference fit with the counter-clamping auxiliary structure can thus be achieved in a simple manner. For example, the counter-clamping auxiliary structure can be configured as a male counter-piece corresponding to a female clamping auxiliary structure. Optionally the counter-clamping auxiliary structure can also be configured as a female counter-piece corresponding to a male clamping auxiliary structure. For example, the clamping auxiliary structure can be a groove or notch, which groove or notch is completely encircling in the circumferential direction. The recess can have any cross-sectional shape, for example, rectangular, triangular, square, round, or oval. Accordingly the counter-clamping auxiliary structure can have an identical or similar cross-section. Under certain circumstances the counter-clamping auxiliary structure can have a smaller extension in the axial direction than the clamping auxiliary structure if the clamping auxiliary structure has the elevation. Alternatively the clamping auxiliary structure can also have a smaller extension in the axial direction than the counter-clamping auxiliary structure if the clamping auxiliary structure has the elevation with respect to the surrounding surface. In some exemplary embodiments the clamping auxiliary structure can include at least one stop in the axial direction or even two stops in the axial direction. Analogously the counter-clamping auxiliary structure can include exactly one or at least one stop in the axial direction or even two such stops.

The counter-clamping auxiliary structure can be disposed, for example, on a radially inwardly directed surface of the clamping jaw. In exemplary embodiments wherein a clamping surface of the clamping jaw, which clamping surface is in contact with the component, is directed radially inward, an interference fit can thus be achieved in the axial direction. In the circumferential direction the counter-clamping auxiliary structure can extend completely along an extension of the clamping surface of the clamping jaw. Alternatively the counter-clamping auxiliary structure can have a smaller extension in the circumferential direction than the clamping jaw or its radially inwardly directed surface, for example, at most 10%, 20%, 30%, 40%, 50%, 60%, 70%, 80%, or 90%. In the axial direction the counter-clamping auxiliary structure can be disposed on an edge of the clamping surface, for example, on an edge facing away from the clamping chuck or on an edge facing the clamping chuck. Alternatively the clamping auxiliary structure can also be disposed spaced from the edges of the clamping jaw. Optionally the component can also be configured such that its radially inwardly directed surface is in contact with at least one radially outwardly directed clamping surface of a clamping jaw of a clamping element.

Additionally or alternatively the clamping auxiliary structure can be disposed in the circumferential direction at least overlapping with respect to the at least one clamping jaw. In some exemplary embodiments it can thereby be made possible that the at least one clamping jaw that includes the counter-clamping auxiliary structure can enter into engagement with the clamping auxiliary structure. In some exemplary embodiments the clamping auxiliary structure may be disposed only in a region that overlaps with the clamping jaw in the circumferential direction. For example, the clamping auxiliary structure that is disposed overlapping with respect to a clamping jaw can have an extension the same as the clamping jaw in the circumferential direction or greater than the clamping jaw in the circumferential direction by more than 5%, 10%, or 20%.

Additionally or alternatively the clamping auxiliary structure can be arranged completely encircling in the circumferential direction. In some exemplary embodiments an arranging of the clamping jaws or of the clamping chuck can thereby be simplified.

Additionally or alternatively the clamping element can include exactly three clamping jaws. In some exemplary embodiments a geometrically determined fixing of the component in the clamping element can thereby be made possible. The three clamping jaws can each be arranged, for example, in an angular spacing of 120°. Additionally or alternatively the three clamping jaws can be disposed at the same axial height. In some exemplary embodiments the clamping element can also include a higher number of clamping jaws, for example, at most four, five, six, seven, eight, or ten.

Additionally or alternatively the base body can be a cylinder, a hollow cylinder, for example, a circular cylinder, a circular hollow cylinder, a cone, for example, a circular cone, a circular hollow cone, or a truncated cone. In some exemplary embodiments it can thereby be achieved that the component is already close to the shape of a final product that is to be manufactured by turning. The product can be all possible end products, for example, a seal, an O-ring, a bearing bush, a spacer, or the like.

Additionally or alternatively the component can comprise an adapter. The adapter can be connected, for example, to the base body and have a larger diameter than the base body. The clamping auxiliary structure can, for example, be disposed on the adapter. In some exemplary embodiments even components having a smaller outer diameter can thereby be clamped by the clamping element. The adapter can be, for example, an annular component. An inner diameter of the adapter can be, for example, identical or similar to an outer diameter of the base body. Under certain circumstances the adapter can include a different material than the base body. The adapter and the base body can possibly be welded to each other. Additionally or alternatively the clamping auxiliary structure can be disposed, for example, overlapping in the axial direction with respect to the adapter. In other words, the adapter can comprise the clamping auxiliary structure. Under certain circumstances the clamping auxiliary structure can be disposed close to an end edge of the adapter, for example, on an end edge that is facing away from the clamping element in a clamped state. The clamping auxiliary structure can be spaced from the end edge, for example, at most by 10%, 5%, 2%, 3%, or 1% of an axial extension of the adapter. The adapter can, for example, be disposed overlapping in an axial direction with respect to the base body. An axial extension of the adapter can correspond to at most 20%, 10%, 5%, or 2% of an axial extension of the base body and/or at least 1%, 2%, 3%, 4%, or 5% of an axial extension of the base body.

Alternatively the clamping auxiliary structure can also be disposed directly on the base body. This can be the case, for example, in exemplary embodiments wherein the component includes no adapter.

Additionally or alternatively the clamping auxiliary structure can have an extension in the axial direction that is smaller than 10%, 5%, 3%, 2%, or 1% and/or is greater than 0.5%, 1%, 2%, or 3% of an axial extension of the component. Additionally or alternatively the counter-clamping auxiliary structure can have an extension in the axial direction that is less than 10%, 5%, 3%, 2%, or 1%, and/or is greater than 0.5%, 1%, 2%, or 3% of an axial extension of the component. In some exemplary embodiments it can thereby be made possible that the clamping auxiliary structure and/or the counter-clamping auxiliary structure occupy only a small amount of space and can nonetheless perform their function. For example, here the extensions mentioned can respectively be an unprocessed state of the component. For example, in a finished state of the component the clamping auxiliary structure and/or the adapter may also have been separated from the final product.

Additionally or alternatively the clamping auxiliary structure and/or the adapter can be disposed at an axial height of the component that corresponds at most to 20%, 10%, 8%, 7%, 6%, or 5% of an axial extension of the component. In some exemplary embodiments it can thereby be made possible that the component is clamped at an edge. For example, here the shorter part of the component that is separated from the longer part of the component by the clamping auxiliary structure can be received in the clamping chuck.

Exemplary embodiments also relate to a component that is configured to be machined. The component comprises a base body made from a plastic, which base body is a circular cylinder, a circular hollow cylinder, a circular cone, or a circular hollow cone, or a truncated cone. The component further comprises at least one clamping aid. The clamping aid is at least one elevation and/or at least one recess with respect to a surface of the component, which surface is adjacent in the axial direction. In some exemplary embodiments it can thereby be made possible that the component can be used in the system according to one of the preceding exemplary embodiments.

Exemplary embodiments also relate to a clamping element that is configured to clamp a component in an interference-fit manner in the axial direction for machining. For this purpose the clamping element comprises at least and/or exactly three clamping jaws, wherein at least one clamping jaw comprises at least one counter-clamping auxiliary structure. The counter-clamping auxiliary structure includes at least one elevation and/or at least one recess with respect to a surface of the clamping jaw, which surface is adjacent in the axial direction. Here it can be, for example, the radially inwardly directed surface of the clamping jaw. In some exemplary embodiments this clamping aid can be used in the above-described system.

Exemplary embodiments also relate to a method that includes providing a cylindrical body to be machined, the cylindrical body having an outer diameter and a longitudinal axis of rotation and being formed of a first material, the first material comprising a plastic, providing an adapter comprising a band of a second material different than the first material, the band comprising an axially extending surface configured to contact the cylindrical body and a radially extending surface configured to extend radially away from the cylindrical body when the axially extending surface contacts the cylindrical body; welding the band to the cylindrical body; placing the cylindrical body and adapter in a clamping chuck having at least three jaws such that a portion of each of the at least three jaws extends radially over the radially extending surface and clamping the cylindrical body; rotating the clamping chuck to rotate the cylindrical body; and machining the cylindrical body.

The exemplary embodiments and their individual features disclosed in the above description, the following claims, and the accompanying Figures can be meaningful and implemented both individually and in any combination for the realization of an exemplary embodiment in its various designs. The Figures thus schematically show the following views.

BRIEF DESCRIPTION OF THE DRAWINGS

FIG. 3 is a schematic depiction of a sectional view through a clamping element according to an exemplary embodiment.

DETAILED DESCRIPTION

In the following description of the accompanying depictions, identical reference numbers designate identical or comparable components. Furthermore, summarizing reference numbers are used for components and objects that appear multiple times in an exemplary embodiment or in an illustration, but that are described together in terms of one or more common features. Components or objects that are described with identical or summarizing reference numbers can be identical with respect to individual, multiple, or all features, for example their dimensions, but possibly also embodied differently provided the description does not explicitly or implicitly indicate otherwise.

Figure 1:
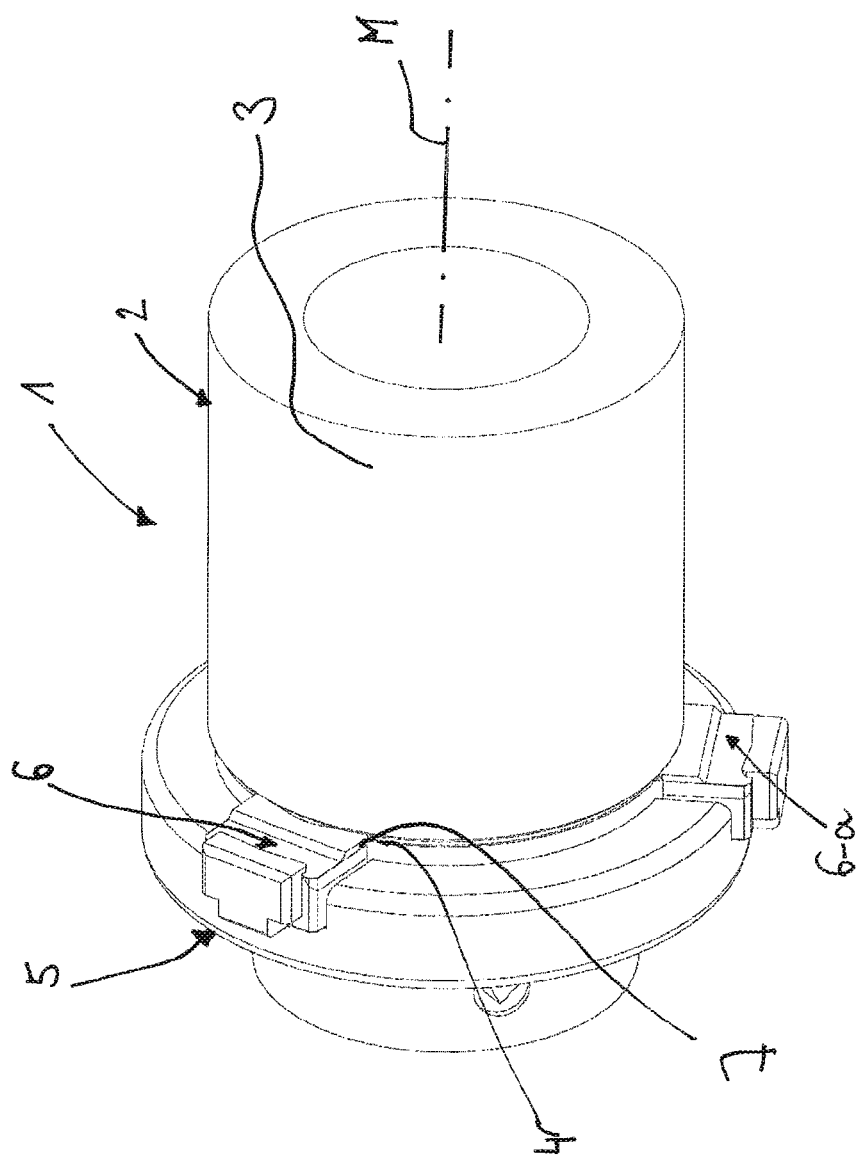
FIG. 1 is a schematic depiction of a perspective view of a system including the component and the clamping element according to an exemplary embodiment.

FIG. 1 shows a schematic depiction of a perspective view of a system 1 for machining of a component 2. For this purpose the system 1 comprises the component 2. The component 2 comprises a base body 3 as well as at least one clamping auxiliary structure 4. The base body 3 includes a plastic as material. The system 1 further comprises a clamping element 5 that is configured to clamp the component 2. The clamping element 5 includes at least one clamping jaw 6. The clamping jaw 6 includes at least one counter-clamping auxiliary structure 7. The counter-clamping auxiliary structure 7 is configured to be in engagement with the clamping auxiliary structure 4 such that the component is fixed and/or positioned in an interference-fit manner in axial direction M with respect to the clamping element 5.

The component 2 is a semi-finished product made from a plastic. For example, it can be machined or turned in order to produce a seal. The base body 3 of the component 2 is a circular hollow cylinder. The further details are described based on the enlarged depiction in FIG. 2.

An adapter 8 is attached to the base body 3. The adapter 8 is a plastic ring that has an inner diameter that approximately corresponds to the outer diameter of the base body 3. An outer diameter of the adapter 8 here is larger than the outer diameter of the base body 3. For example, the adapter 8 can include a different material than the base body 3, however, possibly also a plastic. The adapter 8 can, for example, be welded to the base body 3. A reason for using the adapter 8 can be, for example, to enlarge a diameter of the base body 3 such that it can be better clamped in the clamping element 5. The adapter 8 also comprises the clamping auxiliary structure 4. In some further, not-depicted exemplary embodiment the clamping auxiliary structure can also be disposed directly on the base body. In these cases the adapter can the be omitted or nonetheless be present.

FIG. 3 shows a schematic depiction of a cross-section through the adapter 8. The clamping auxiliary structure 4 can also be seen in the cross-section. The clamping auxiliary structure 4 is a recess with respect to a surface 9 of the adapter 8. A shoulder thereby arises including an end surface 10 facing in the axial direction. In this case the clamping auxiliary structure 4 is thus configured as a recess. In contrast, the counter-clamping auxiliary structure 7 on the clamping jaw 6 is configured as a radial protrusion that abuts on the end side 10 in the axial direction.

Figure 2:
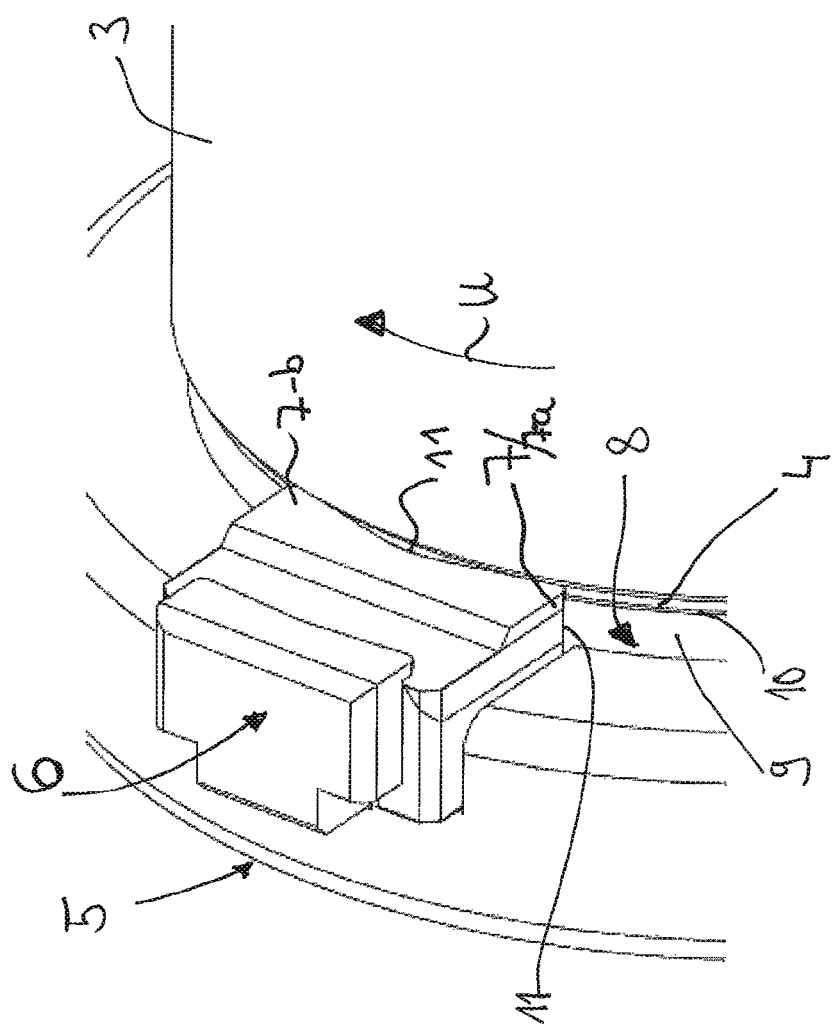
FIG. 2 is a schematic depiction of an enlarged section of FIG. 1.

As can be seen in FIG. 2, the counter-clamping auxiliary structure 7 is not formed on the clamping jaw 6 completely along the circumferential direction U, but rather interrupted by an arcuate recess 11. A counter-clamping auxiliary structure 7-$a$ and a counter-clamping auxiliary structure 7-$b$ thereby respectively arise on ends of the clamping jaw 6 directed in circumferential direction U. A radial extension of the counter-clamping auxiliary structure 7-$a$ here can have, for example, at least 1%, 2%, 3%, 4%, 5%, or 10% of an outer diameter of the component 2 and/or at most 10%, 9%, or 8%.

In other words, in the exemplary embodiment of the Figures a single clamping jaw 6 includes two counter-clamping auxiliary structures 7-$a$ and 7-$b$ that are spaced from each other in circumferential direction U. In some further, not-depicted exemplary embodiments each clamping jaw can also have only one counter-clamping auxiliary structure.

A clamping section 11 of the clamping jaw 6 adjacent in the axial direction or its radially inwardly directed surface abuts in the radial direction on the surface 9 of the adapter 8. In some further, not-depicted exemplary embodiments this surface can also be spaced from the adapter. The counter-clamping auxiliary structure 7 protrudes in the radial direction farther radially inward than the clamping section 11.

Overall the clamping element 5 comprises two further clamping jaws, namely the clamping jaw 6-*a* that can be seen in FIG. 1 and a further, not-depicted clamping jaw. The three clamping jaws are each disposed spaced with respect to one another in the circumferential direction at an angle of 120°. In some further, not-depicted exemplary embodiments a different number of clamping jaws can also be provided.

In other words, in some exemplary embodiments it can be an interference-fit clamping system for plastic semi-finished products on CNC lathes or other lathes. The attaching of the component, which can also be referred to as semi-finished product, can be effected by an interference fit and not by friction as with conventional clamping systems. In some exemplary embodiments clamping forces can thereby be reduced and the deforming of the component or of the plastic semi-finished product at least reduced or completely avoided.

Compared with conventional clamping systems, wherein often up to 18 clamping-jaw sets must be used for diameter ranges of 30 to 400 mm, in some exemplary embodiments a clamping chuck with respectively three identical jaws can cover a variety of diameters, for example also larger than 30 mm, 40 mm, 50 mm, 60 mm, 70 mm, 80 mm, 90 mm, 100 mm, 120 mm, 130 mm, 140 mm, 150 mm, 200 mm, 250 mm, 300 mm, or 350 mm, and less than 400 mm, 450 mm, or 300 mm.

The clamping jaws 6 can, for example, be equipped with a hook as counter-clamping auxiliary structure 7, which hook engages in a corresponding groove that serves as clamping auxiliary structure in the component 2 or the semi-finished product. The dimensions of the hook of the clamping jaw 7 and the groove in the component 2 are matched to each other such that an interference-fit fixing can be made possible. In some exemplary embodiments the producing of the groove or of the recess in the semi-finished product does not represent increased expense. For clamping the semi-finished product 2, for example, three clamping jaws can be moved inward. The component 2 can thereby be clamped.

In some exemplary embodiments, instead of the 18 clamping-jaw sets two simple-to-manufacture clamping jaw sets, which each comprise three clamping jaws, can now be used with the counter-clamping auxiliary structures. In some exemplary embodiments the costs for clamping devices can thereby decrease, since a smaller number clamping-jaw sets are needed. The clamping element can possibly be used for a larger range of diameters. The component can be clamped more securely since it is clamped in the axial direction in an interference-fit manner and not only by friction. In some exemplary embodiments costs can possibly decrease in ongoing operation since the time for a jaw change is reduced. Furthermore, additional customer retention can possibly be achieved since in some exemplary embodiments the clamping jaws can only be used with the corresponding components or semi-finished parts. The clamping element can be, for example, a three-jaw manual clamping chuck.

The system or the clamping element and the component can be used not only as described for the Figures, for the manufacturing of seals from a plastic semi-finished product, but also for the manufacturing of all possible components that can be produced from plastic in a turning process, for example, cages, bearing discs, sliding discs, spacers, or the like.

The exemplary embodiments and their individual features disclosed in the above description, the following claims, and the accompanying Figures can be meaningful and implemented both individually and in any combination for the realization of an exemplary embodiment in its various designs.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved machining systems.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

1 System
2 Component
3 Base body
4 Clamping auxiliary structure
5 Clamping element
6 Clamping jaw
7 Counter-clamping auxiliary structure
8 Adapter
9 Surface
10 End side
11 Clamping section
U Circumferential direction
M Axial direction

What is claimed is:
1. A system comprising:
  a component to be machined, the component comprising a plastic base body having an outer diameter and a longitudinal axis and at least one clamping auxiliary structure; and
  a clamping element configured to clamp the component using the clamping auxiliary structure,
  wherein the clamping element includes at least one clamping jaw including at least one counter-clamping auxiliary structure, the counter-clamping auxiliary structure being configured to engage the clamping auxiliary structure and to fix the component in an interference-fit manner in the axial direction with respect to the clamping element, wherein the component comprises an adapter that is connected to the base body, the adapter having an outer diameter larger than the outer diameter of the base body, and wherein the clamping auxiliary structure is disposed on the adapter.

2. The system according to claim 1, wherein the clamping auxiliary structure circumferentially overlaps the at least one clamping jaw.

3. The system according to claim 2, wherein the clamping element includes exactly three clamping jaws.

4. The system according to claim 1, wherein the base body is a cylinder, circular cylinder, circular hollow cylinder, circular cone, circular hollow cone, or truncated cone.

5. The system according to claim 1, wherein the clamping auxiliary structure and/or the counter-clamping auxiliary structure has an extension in the axial direction that is less than 10% of an axial extension of the component.

6. The system according to claim 1, wherein the clamping auxiliary structure and/or the adapter is disposed at an axial height of the component that corresponds to at most 20% of an axial extension of the component.

7. A system comprising:
a component to be machined, the component comprising a plastic base body having an outer diameter and a longitudinal axis and at least one clamping auxiliary structure; and
a clamping element configured to clamp the component using the clamping auxiliary structure,
wherein the clamping element includes at least one clamping jaw including at least one counter-clamping auxiliary structure, the counter-clamping auxiliary structure being configured to engage the clamping auxiliary structure and to fix the component in an interference-fit manner in the axial direction with respect to the clamping element, and
including an adapter formed from a material different than a material of the base body, the adapter being welded to the component, the adapter having a first outer diameter greater than the outer diameter of the base body, wherein the clamping auxiliary structure comprises a radially extending surface of the adapter and wherein the counter-clamping auxiliary structure comprises a portion of the at least one clamping jaw radially overlapping the radially extending surface.

8. The system according to claim 7 wherein the adapter comprises a first cylindrical portion and a second cylindrical portion axially spaced from the first cylindrical portion, the first cylindrical portion having the first outer diameter and the second cylindrical portion having a second outer diameter greater than the outer diameter of the base body and less than the first outer diameter, wherein the clamping auxiliary structure comprises a radially extending wall connecting the first cylindrical portion to the second cylindrical portion.

9. The system according to claim 1, wherein the adapter is formed from a material different than a material of the base body, wherein the adapter is welded to the component, wherein the adapter has a shoulder formed by an axial wall and a radial wall, and wherein the counter-clamping auxiliary structure comprises a surface complementary to the shoulder for forming an interference fit with the shoulder.

10. The system according to claim 1, wherein the component is clamped by the clamping element and wherein the clamping element comprises a clamping chuck of a machine tool.

11. The system according to claim 1,
wherein the adapter comprises a ring having an inner surface, and wherein the inner surface of the ring is connected to an outer surface of the base body.

12. The system according to claim 11, wherein the inner surface of the ring is welded to the outer surface of the base body.

13. The system according to claim 1, wherein the adapter is formed from a material different than a material of the base body.

* * * * *